US010439820B2

(12) United States Patent
Egner et al.

(10) Patent No.: US 10,439,820 B2
(45) Date of Patent: Oct. 8, 2019

(54) METHOD AND APPARATUS FOR SECURE ACCESS TO A MOBILE EDGE COMPUTING GATEWAY DEVICE BASED ON A SUBSCRIBER LOCATION FINGERPRINT

(71) Applicant: Dell Products, LP, Round Rock, TX (US)

(72) Inventors: Will A. Egner, Cedar Park, TX (US); Liam B. Quinn, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 282 days.

(21) Appl. No.: 15/627,300

(22) Filed: Jun. 19, 2017

(65) Prior Publication Data

US 2018/0367314 A1 Dec. 20, 2018

(51) Int. Cl.
| | |
|---|---|
| *H04L 29/06* | (2006.01) |
| *H04L 9/32* | (2006.01) |
| *H04W 4/02* | (2018.01) |
| *H04W 88/16* | (2009.01) |

(52) U.S. Cl.
CPC ........ *H04L 9/3247* (2013.01); *H04L 63/0281* (2013.01); *H04L 63/0428* (2013.01); *H04L 63/06* (2013.01); *H04L 63/08* (2013.01); *H04L 63/0807* (2013.01); *H04L 63/107* (2013.01); *H04W 4/025* (2013.01); *H04W 88/16* (2013.01)

(58) Field of Classification Search
None
See application file for complete search history.

(56) References Cited

U.S. PATENT DOCUMENTS

| | | | |
|---|---|---|---|
| 8,572,696 B1 * | 10/2013 | Wiacek | H04W 4/02 380/247 |
| 8,768,618 B1 | 7/2014 | Christie | |
| 9,137,324 B2 | 9/2015 | Ims | |
| 9,374,678 B2 | 6/2016 | Gupta | |
| 9,426,182 B1 * | 8/2016 | Zeljko | H04L 63/20 |
| 9,459,339 B2 | 10/2016 | Mansour | |
| 10,034,139 B2 * | 7/2018 | Woo | H04W 4/027 |
| 2001/0022558 A1 * | 9/2001 | Karr, Jr. | G01S 1/026 342/450 |

(Continued)

*Primary Examiner* — Malcolm Cribbs
(74) *Attorney, Agent, or Firm* — Prol Intellectual Property Law, PLLC; H. Kenneth Prol

(57) ABSTRACT

A method for secure access to a mobile edge computing gateway device based on a subscriber location fingerprint may comprise receiving a request to access the mobile edge computing gateway, a first user credential, and an encrypted token from a requesting user, associating the first user credential with a block chain location fingerprint for the subscribing user, including a plurality of time-stamped records of a plurality of estimated or measured location state variables of the subscribing user and an associated confidence interval representing an accuracy of those variables, decrypting the location fingerprint, receiving a requesting user location measurement, predicting a current location for the subscribing user and an associated current confidence interval based on recent location state variables in the location fingerprint, and allowing the requesting user access to the mobile edge computing gateway when the received requesting user location measurement falls within the value of the current confidence interval.

20 Claims, 9 Drawing Sheets

(56) References Cited

U.S. PATENT DOCUMENTS

| | | | |
|---|---|---|---|
| 2002/0123343 A1* | 9/2002 | Wiedeman | H04B 7/18513 455/429 |
| 2004/0028017 A1* | 2/2004 | Whitehill | H04L 63/0492 370/338 |
| 2004/0264404 A1* | 12/2004 | Zegelin | H04L 63/0492 370/328 |
| 2005/0071687 A1* | 3/2005 | Pathakis | H04L 63/0407 726/19 |
| 2005/0166041 A1 | 7/2005 | Brown | |
| 2006/0143292 A1* | 6/2006 | Taubenheim | H04L 63/10 709/225 |
| 2008/0113787 A1* | 5/2008 | Alderucci | G06F 21/31 463/29 |
| 2013/0031240 A1 | 1/2013 | Byzek | |
| 2014/0148183 A1* | 5/2014 | Stanforth | H04W 64/00 455/452.1 |
| 2014/0213294 A1* | 7/2014 | Marti | G01S 5/0252 455/456.2 |
| 2014/0368386 A1 | 12/2014 | Mansour | |
| 2015/0073980 A1* | 3/2015 | Griffin | H04W 4/21 705/39 |
| 2015/0249907 A1 | 9/2015 | Gupta | |
| 2015/0382137 A1* | 12/2015 | Prehn | G06F 16/9537 705/39 |
| 2016/0055322 A1* | 2/2016 | Thomas | G06F 21/10 726/7 |
| 2016/0057124 A1 | 2/2016 | Boyle | |
| 2016/0183085 A1* | 6/2016 | Yerrabommanahalli | H04W 12/04 713/153 |
| 2016/0283920 A1* | 9/2016 | Fisher | H04L 9/3239 |
| 2017/0064037 A1 | 3/2017 | Das | |
| 2017/0109685 A1 | 4/2017 | Bianchi | |
| 2018/0068103 A1* | 3/2018 | Pitkanen | H04L 63/0861 |
| 2018/0191695 A1* | 7/2018 | Lindemann | H04L 63/0853 |
| 2018/0276630 A1* | 9/2018 | Kim | G06Q 20/102 |
| 2018/0343544 A1* | 11/2018 | Fan | H04W 4/025 |

* cited by examiner

| State No. | Time Of Measurement (GMT) | Position (GPS Coord.) | Velocity | Acceleration |
|---|---|---|---|---|
| 1 | 16:59:27; 6/1/17 | Chicago, US | 350 km/h | 542 km/h$^2$ |
| 2 | 19:24:18; 6/1/17 | New York, US | 892 km/h | 27 km/h$^2$ |
| 3 | 7:48:16; 6/2/17 | London, UK | 0.02 km/h | 0 km/h$^2$ |
| 4 | 9:22:15; 6/2/17 | Hyderabad, India | 0 km/h | 0 km/h$^2$ |

Blockchain of Measured State Conditions
402

FIG. 4

| Time of Calculation (Time Stamp) | Estimated Position | Estimated Velocity | Estimated Acceleration | Most Popular Location | Second Most Popular Location | Confidence Interval |
|---|---|---|---|---|---|---|
| 16:30:27; 6/1/17 | Chicago, US | 0.2 km/h | 0 km/h² | London, UK | Chicago, US | 95% |
| 19:00:18; 6/1/17 | New York, US | 900 km/h | 5 km/h² | London, UK | Chicago, US | 87% |
| 7:00:16; 6/2/17 | London, UK | 900 km/h | 5 km/h² | London, UK | Chicago, US | 92% |
| 9:00:15; 6/2/17 | London, UK | 0.1 km/h | 0.02 km/h² | London, UK | Chicago, US | 99% |

Table of Subscriber Location Fingerprints 502

FIG. 5

METHOD AND APPARATUS FOR SECURE ACCESS TO A MOBILE EDGE COMPUTING GATEWAY DEVICE BASED ON A SUBSCRIBER LOCATION FINGERPRINT

FIELD OF THE DISCLOSURE

The present disclosure generally relates to security of data accessed by mobile information handling systems, and more specifically to inhibiting unauthorized access to remote computing capabilities via a mobile edge computing gateway device.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include security capabilities for identifying and inhibiting access by unauthorized users.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 4 is a block diagram illustrating a block chain of subscriber location fingerprints according to an embodiment of the present disclosure;

FIG. 5 is a graphical diagram illustrating a plurality of geographical locations of one or more information handling systems according to an embodiment of the present disclosure;

The use of the same reference symbols in different drawings may indicate similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

As mobile computing infrastructure evolves worldwide to enable mobile information handling systems to transmit and receive larger amounts of data more quickly and easily while on the move, tasks previously completed only on stationary information handling systems are now being completed on mobile devices. However, there is a competing need to keep mobile devices lightweight and decrease battery consumption. One solution to these contrasting needs is to make competing services previously confined to a single information handling system (stationary or mobile) available on a plurality of mobile devices, on command, via mobile edge computing gateway devices connected to the cloud. In such a system, called a nomadic computing services system, each subscriber to the system may have access to his or her data and applications, including client information, payment information, personal files, and bank account details through any mobile information handling systems the subscriber may use to access the mobile edge computing gateway device. A solution is needed in such a system to ensure only the authorized subscriber may access his or her nomadic computing resources via the mobile edge computing gateway device.

Embodiments of the present disclosure provide a solution to this problem in the form of a location fingerprint security system. The location fingerprint security system in embodiments of the present disclosure may solve this problem by recording state measurements (including position, velocity, and acceleration of a subscriber's mobile information handling system within a block chain format, using those state variables to estimate the subscriber's future position, and only granting access to future requests to access that subscriber's nomadic computing services from an information handling system located within a preset threshold radius of the estimated future location.

Figure 1:
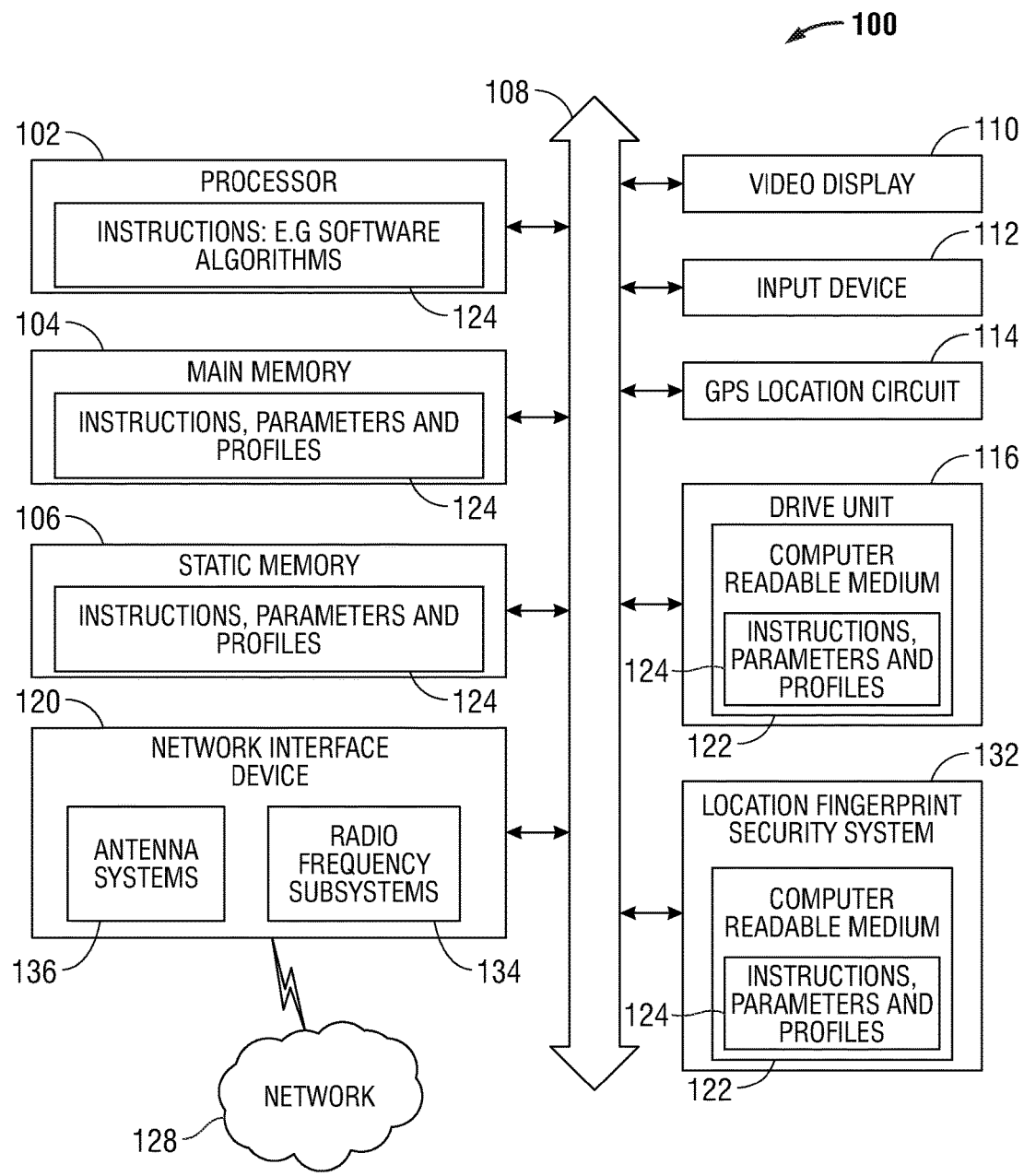
FIG. 1 is a block diagram illustrating an information handling system according to an embodiment of the present disclosure.

FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality. The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

FIG. 1 shows an information handling system 100 capable of administering each of the specific embodiments of the present disclosure. For example, the information handling system 100 can represent a gateway device operating as wireless network access point located anywhere within a network of access points or may also represent aspects of a mobile information handling system in communication with the gateway device. A gateway device may execute instructions via a processor for a location fingerprint security system according to embodiments disclosed herein. The location fingerprint security system of various embodiments of the present disclosure may operate in some example embodiments as a software agent, in whole or in part, within a gateway device or other wireless network access point while other portions of the location fingerprint security system may operate on remote server systems or within mobile information handling systems operating within the same network as the gateway device. Information handling system 100 may also represent a networked server or other system and administer some or all aspects of the location fingerprint security system via instructions executed on a processor according to various embodiments herein involving remote operation of such systems.

For example, an information handling system 100 may be any mobile or other computing device capable of executing a set of instructions (sequential or otherwise) that specify actions to be taken by that machine. In a particular embodiment, the information handling system 100 can be implemented using electronic devices that provide voice, video, or data communication. Further, while a single information handling system 100 is illustrated, the term "system" shall also be taken to include any collection of systems or sub-systems that individually or jointly execute a set, or multiple sets of instructions to perform one or more computer functions.

Information handling system 100 can include devices or modules that embody one or more of the devices or execute instructions for the one or more systems and modules described above, and operates to perform one or more of the methods described above. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 can include memory such as main memory 104, static memory 106, computer readable medium 122 storing instructions 124 of the location fingerprint security system 132, and drive unit 116 (volatile (e.g. random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices.

As shown, the information handling system 100 may further include a video display 110. The video display 110 in an embodiment may function as a liquid crystal display (LCD), an organic light emitting diode (OLED), a flat panel display, a solid state display, or a cathode ray tube (CRT). Additionally, the information handling system 100 may include an alpha numeric input device 112, such as a keyboard, and/or a cursor control device, such as a mouse, touchpad, or gesture or touch screen input, and a GPS location circuit 114 capable of measuring a geographic location in three-dimensions, a velocity, and an acceleration of a mobile information handling system.

The information handling system 100 can also include a disk drive unit 116. The information handling system 100 can also represent a server device whose resources can be shared by multiple client devices, or it can represent an individual client device, such as a desktop personal computer, a laptop computer, a tablet computer, or a mobile Smartphone.

Network interface device 120 represents a NIC disposed within information handling system 100, on a main circuit board of the information handling system, integrated onto another component such as processor 102, in another suitable location, or a combination thereof. The network interface device 120 can include another information handling system, a data storage system, another network, a grid management system, another suitable resource, or a combination thereof. Network interface device 120 in an embodiment may operably connect to a network 128. Connection to network 128 may be wired or wireless.

The network interface device shown as wireless adapter 120 can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. Wireless adapter 120 may include one or more radio frequency subsystems 134 with transmitter/receiver circuitry, wireless controller circuitry, amplifiers and other circuitry for wireless communications. The wireless adapter 120 may also include antenna system 136 which may be tunable antenna systems for use with the system and methods disclosed herein. The radio frequency subsystems 134 include wireless controllers to manage authentication, connectivity, communications, power levels for transmission, buffering, error correction, baseband processing, and other functions of the wireless adapter 120.

The information handling system 100 can include a set of instructions 124 that can be executed to cause the computer system to perform any one or more of the methods or computer based functions disclosed herein. For example, instructions 124 may execute a location fingerprint security system, software agents, or other aspects or components. Similarly instructions 124 may execute the location fingerprint security system disclosed herein for granting access to a mobile information handling system only after determining the entity requesting access is located within a preset threshold distance from an estimated location of the mobile information handling system.

Various software modules comprising application instructions 124 may be coordinated by an operating system (OS), and/or via an application programming interface (API). An example operating system may include Windows®, Android®, and other OS types known in the art. Example APIs may include Win 32, Core Java API, or Android APIs.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a PDA, a mobile information handling system, a wearable computing device, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The disk drive unit 116 and the location fingerprint security system 132 may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124 including a plurality of block chains, where each block chain includes historical positional data for a single subscriber to a nomadic computing services system. The disk drive unit 116 and static memory 106 also contain space for data storage. Further, the instructions 124 may embody one or more of the methods or logic as described herein. For example, instructions relating to the location fingerprint security system software algorithms may be stored here. In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the location fingerprint security system may be executed locally or remotely. For example, portions of the location fingerprint security system may be executed at a mobile edge computing gateway while other portions of the location fingerprint security system may be executed at a remotely located authentication server. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The location fingerprint security system 132 and the drive unit 116 may include a computer-readable medium 122 such as a magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may also include a location fingerprint security system 132 that may be operably connected to the bus 108. The location fingerprint security system 132 computer readable medium 122 may also contain space for data storage. The location fingerprint security system 132 may perform tasks related to granting access to a mobile information handling system after determining the entity requesting access is located within a preset threshold distance from an estimated location of an authorized subscriber. The location fingerprint security system 132 may reside in a mobile edge computing gateway device in communication with a mobile information handling system and with one or more cloud computing resources. In an embodiment, the mobile edge computing gateway device may operate to police access by a plurality of mobile information handling systems to a subscriber's nomadic computing resources, located on a cloud computing device or on a remote server in communication with the mobile edge computing gateway. The memory 104 may store a subscriber's nomadic computing data, and the processor 102 may operate to perform code instructions of a nomadic computing service. In other embodiments, the computing data and processing capabilities of the nomadic computing service may reside outside the information handling system 100, and the mobile edge computing gateway device may operate to police communication between a mobile information handling system and the nomadic computing services residing outside the information handling system 100.

The fingerprint location security system 132 residing within a mobile edge computing gateway in an embodiment may control access to a subscriber's nomadic computing services by authenticating a requesting user is an authorized subscriber to that content. In doing so, the fingerprint location security system 132 may receive from a mobile information handling system a request for access to a subscriber's nomadic computing services, a first user identification, a measurement of the geographical location of the requesting user's mobile information handling system, and an encryption key. The fingerprint location security system 132 may access a plurality of block chains stored in the memory 104, and identify the block chain associated with the received first user identification. Each block chain may contain a plurality of "blocks," or time-stamped records of positional data for a subscriber. Each block may be encrypted, and may include a plurality of state variables indicating a subscriber's geographic location, velocity, and acceleration at the time of the time-stamp. The state variables of a block may be either measured or estimated based on previous measured state variables, and each time-stamped group of state variables may be associated with a confidence interval representing the calculated accuracy of the measurement or estimation of the state variables at the time given in the time-stamp associated with those state variables. The memory 104 may store a plurality of block chains, and may be located at the mobile edge computing gateway device, at a cloud computing resource, or at a node within the mobile edge computing gateway device network. In an example embodiment, the memory 104 may be located within a remotely located authentication server in communication with the mobile edge computing gateway device.

Once the proper block chain has been identified, the location fingerprint security system 132 may use the received encryption key to decrypt the identified block chain. The memory 104 in an embodiment may store a plurality of encryption schemes, wherein each scheme is associated with a subscriber. Each subscriber's mobile information handling systems may include a location fingerprint security system 132 agent or API that receives an encryption key identifying the encryption scheme assigned to that subscriber's block chain by the mobile edge computing gateway. Upon requesting access to that subscriber's nomadic computing services, the location fingerprint security system 132 agent operating on the subscriber's mobile information handling system may transmit this previously received encryption key back to the mobile edge computing gateway in order to decrypt the block chain identified as being associated with the subscriber whose nomadic computing services are requested.

Once the subscriber's block chain has been identified and decrypted, the location fingerprint security system 132 in an embodiment may estimate a current location of the subscriber based on the previously recorded state variables stored in the subscriber's decrypted block chain, along with a confidence interval indicating the accuracy of the estimation. The location fingerprint security system 132 in an embodiment may then grant access to the requesting mobile information handling system if the received measured location of that mobile information handling system lies within a distance equal to or lesser than the value of the confidence interval from the estimated current position of the subscriber. In an embodiment, the location fingerprint security system 132 may communicate with the main memory 104, the processor 102, the video display 110, the alpha-numeric input device 112, the GPS location circuit 114, and the network interface device 120 via bus 108, and several forms of communication may be used, including ACPI, SMBus, a 24 MHZ BFSK-coded transmission channel, or shared memory.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
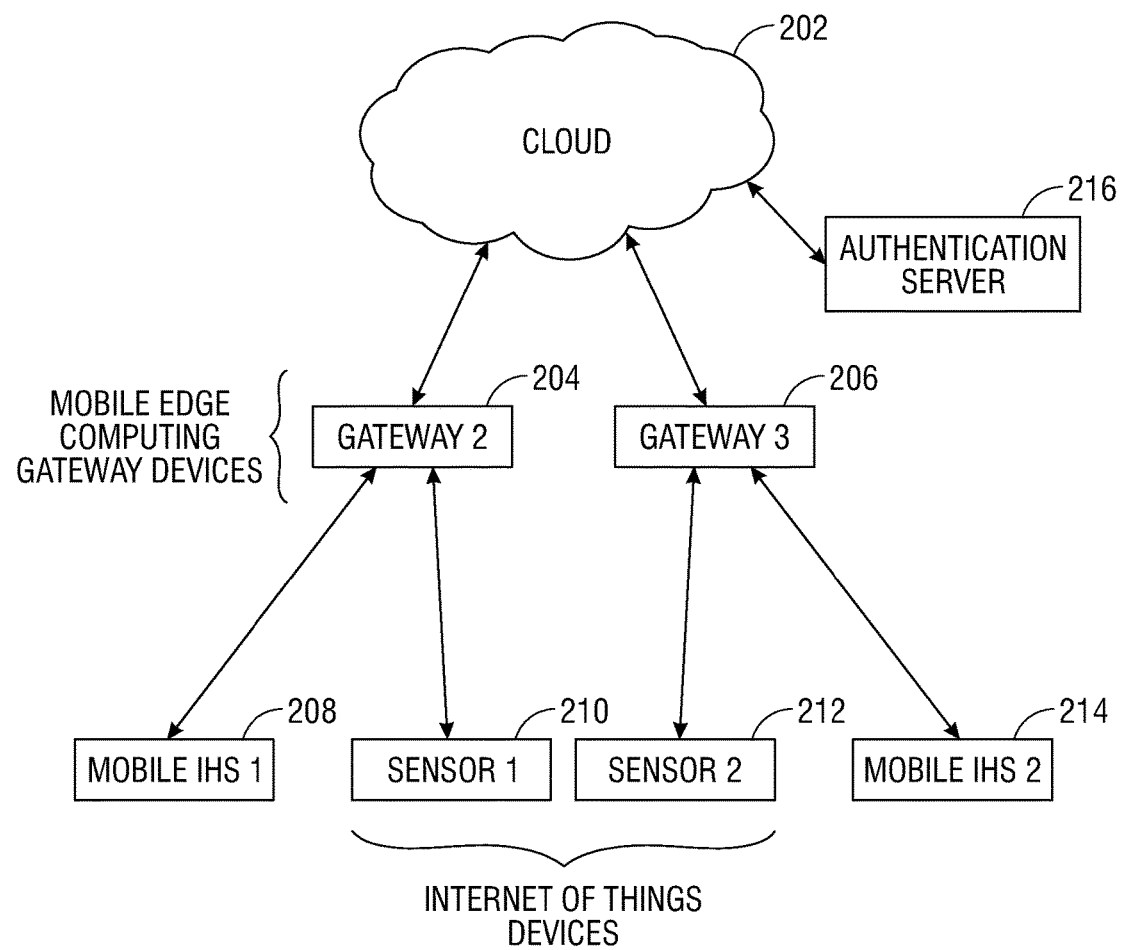
FIG. 2 is a block diagram illustrating a mobile information handling system within a network according to an embodiment of the present disclosure.

FIG. 2 is a block diagram illustrating a mobile edge computing gateway device policing access of a mobile information handling system to a subscriber's nomadic computing services within a network according to an embodiment of the present disclosure. As shown in FIG. 2, a network 200 in an embodiment may include a network of cloud computing resources, referred to as the "cloud" 202, in communication with one or more mobile edge computing gateway devices 204 and 206 and with an authentication server 216. Each of the gateway devices 204 and 206 in an embodiment may also be in communication with a plurality of mobile information handling systems 208, and 214, and with one or more sensors 210 and 212 operating as devices within the "internet of things" (IoT). Further, each of the mobile information handling systems 208 and 214 may move from the network services, including local compute resources, by one mobile edge computing gateway device to a network serviced by another mobile edge computing gateway device, as described in greater detail below.

Subscribers to a nomadic computing services system in an embodiment may be capable of accessing computing services associated with that subscriber at any mobile information handling system, including mobile information handling system 1 208 or mobile information handling system 2 214. The subscriber's sensitive private data in an embodiment may be stored at a cloud computing resource within the cloud 202, but may be accessed at mobile information handling system 1 208 or mobile information handling system 2 214 using the nomadic computing services system. Each of the mobile edge computing gateway devices 204 and 206 in an embodiment may work with the authentication server 216 to police access to a subscriber's data via any mobile information handling system. The authentication server 216 in an embodiment may include a memory storing one or more block chains of information detailing measured locations of each known mobile information handling system belonging to a subscriber, as well as estimated locations of those mobile information handling systems. The authentication server 216 in an embodiment may also operate to issue user credentials and encryption tokens to authenticated subscribers and authenticated subscriber mobile information handling systems, and to encrypt and decrypt the stored block chains for each subscriber according to the issued user credentials and encryption tokens. In order to gain access to the subscriber's nomadic computing services, a mobile edge computing device in an embodiment may first require the mobile information handling system requesting access to show it is in use by the authorized subscriber.

As described in greater detail below, the location fingerprint security system, operating within each gateway device 204 and 206 and within the authentication server 216 may verify a mobile information handling system requesting access to a subscriber's data is being operated by that subscriber by comparing the position of the requesting mobile information handling system to an estimated location of the subscriber, where the estimation is made based on the last known coordinates, velocity, and acceleration of a mobile information handling system previously confirmed to be in use by the subscriber. This security measure may be enacted by each mobile edge computing gateway device through which a mobile information handling system requests access to subscriber data or services and, in part, by the authentication server 216. For example, a user of mobile information handling system 1 208 in an embodiment may request access via gateway 2 204, receive access, then move to the network serviced by gateway 3 206. In such an embodiment, gateway 3 206 may work in tandem with the authentication server 216 to employ the location fingerprint security system to ensure the user of mobile information handling system 1 208 is in use by the authorized subscriber.

The fingerprint location security system residing within one of the mobile edge computing gateways 204 and 206 and, in part, within the authentication server 216, in an embodiment, may control access to a subscriber's nomadic computing services by authenticating a requesting user is an authorized subscriber to that content. A subscriber's personal nomadic computing data and nomadic computing services may be located at the mobile edge computing gateways 204 and/or 206, the authentication server 216, or may be located at a remotely located server in the cloud 202. The location fingerprint security system in an embodiment may communicate with a memory of the authentication server 216 storing a block chain including a plurality of time-stamped records of the subscriber's measured or estimated positions. The authentication server 216 in an embodiment may also receive and store additional time-stamped records of the subscriber's measured or estimated positions as time progresses. The authentication server 216 in such an embodiment may encrypt a received, measured location record, or encrypt an estimated location record, and may transmit an encryption key indicating the method used to encrypt that location record to a mobile information handling system previously confirmed to be operated by the authorized subscriber associated with the block chain in which the authentication server 216 stored the received or estimated location record. In other embodiments, the memory may be located at one of the mobile edge computing gateways 204 or 206, and one or both of those gateways 204 and/or 206 may perform the tasks of storing and encrypting subscriber location records within the subscriber's block chain, as well as transmitting an encryption key identifying the encryption assigned to such records to the subscriber's mobile information handling system.

The mobile edge computing device 204 in an embodiment may receive from mobile information handling system 1 208 (which may or may not be operated by an authorized subscriber) a request for access to the subscriber's nomadic computing services located in the cloud 202, a first user identification, a measurement of the geographical location of mobile information handling system 1 208, and an encryption key. In an embodiment where the memory is located at the authentication server 216, the mobile edge computing gateway 204 may forward on to the authentication server 216 the decryption key and the user identification. In such an embodiment, the authentication server 216 may use the user identification to identify the proper block chain stored at the authentication server, decrypt the identified block chain using the decryption key, estimate the current location of the subscriber as being within the service area of the mobile edge computing gateway 204, and transmit the decrypted block chain back to the mobile edge computing gateway 204. The mobile edge computing gateway 204 in such an embodiment may then receive a requested location measurement from the mobile information handling system 1 208, and if the received measured location is within a preset tolerance of the estimated subscriber location transmitted from the authentication server 216 to the mobile edge computing gateway 204, as described above, allow access to the subscriber's nomadic computing services at the mobile information handling system 1 208.

In an embodiment where the memory storing the block chains is stored at the mobile edge computing gateway 204, once the proper block chain has been identified, the location fingerprint security system located at the mobile edge computing gateway 204 may use the received encryption key to decrypt the identified block chain. This may include a location fingerprint security system agent or API that receives an encryption key identifying the encryption scheme assigned to that subscriber's block chain by the mobile edge computing gateway 204 or by the authentication server 216. If the mobile information handling system 208 is operated by the authorized subscriber, upon requesting access to that subscriber's nomadic computing services, the location fingerprint security system agent operating on the subscriber's mobile information handling system 208 may transmit this previously received encryption key back to the mobile edge computing gateway 204 in order to decrypt the block chain identified as being associated with the subscriber whose nomadic computing services are requested.

Once the subscriber's block chain has been identified and decrypted, the location fingerprint security system located at the mobile edge computing gateway 204 in an embodiment may estimate a current location of the subscriber based on the previously recorded state variables stored in the subscriber's decrypted block chain, along with a confidence interval indicating the accuracy of the estimation. The location fingerprint security system located at the mobile edge computing gateway 204 in an embodiment may then grant access to the requesting mobile information handling system 208 if the received measured location of that mobile information handling system 208 lies within a distance equal to or lesser than the value of the confidence interval from the estimated current position of the subscriber.

Figure 3:
FIG. 3 is a graphical diagram illustrating a plurality of geographical locations of one or more information handling systems according to an embodiment of the present disclosure.

FIG. 3 is a graphical diagram illustrating a plurality of global geographical locations of one or more information handling systems according to an embodiment of the present disclosure. The location fingerprint security system in an embodiment may be capable of receiving, storing, and accessing blocks of information, each containing state variables for an information handling system measured or estimated at a given time indicated by a timestamp within the block. FIG. 3 is an illustration of four different locations measured according to an embodiment of the present disclosure.

For example, state variable 1 302 may be measured by the GPS logic circuit of a mobile information handling system verified to be in use by an authorized subscriber at 5 p.m. GMT, and may include a geographical location of Chicago, U.S., a velocity of 350 km/h (indicating the mobile information handling system is in transit aboard a high speed vehicle), and an acceleration of 542 km/h$^2$ (also indicating the mobile information handling system is in transit aboard a high speed vehicle). As another example, state variable 2 304 may be measured by the GPS logic circuit of the same mobile information handling system at about 7:30 p.m. GMT, and may include a geographical location of New York, U.S., a velocity of 892 km/h (indicating the mobile information handling system is still in transit aboard a high speed vehicle), and an acceleration of 27 km/h$^2$. As yet another example, state variable 3 306 may be measured by the GPS logic circuit of the same mobile information handling system at about 7:50 a.m. GMT the following day, and may include a geographical location of London, U.K., a velocity of 0.02 km/h (indicating the mobile information handling system is no longer in transit aboard a high speed vehicle), and an acceleration of 0 km/h$^2$ (also indicating the mobile information handling system is no longer in transit aboard a high speed vehicle).

As described in greater detail below, the location fingerprint security system in an embodiment may receive a request to access the nomadic computing services of the same subscriber from an unverified information handling system (which may, in fact, be the mobile information handling system previously verified as being in use by the authorized user) at around 9:30 a.m. GMT, the same morning that state variable 3 was recorded. The location fingerprint security system may request and receive a geographic location of the requesting information handling system in response to the request for access. State variable 4 308, as shown in FIG. 3 may include a geographical location for the requesting information handling system in Hyderabad, India, a velocity of 0 km/h (indicating the requesting information handling system may be stationary, rather than mobile) and an acceleration of 0 km/h$^2$ (also indicating the requesting information handling system may be stationary, rather than mobile).

As also described in greater detail below, upon receiving the request to access the mobile information handling system, the location fingerprint security system may access the received and stored state variable 3 indicating the last known position for the mobile information handling system occurred roughly two hours earlier, and placed the subscriber in London, U.K. The location fingerprint security system in such an embodiment may estimate the likely position of the subscriber at the time of the request to access the mobile information handling system, based on the geographic location, velocity, and acceleration recorded in state variable 3, along with a confidence interval, indicating the accuracy of the estimation. As further described below, the location fingerprint security system may compare the estimated location of the mobile information handling system with the geographic location of the requesting information handling system in Hyderabad, India to determine the requesting information handling system could not possibly be in use by the subscriber since it is physically impossible for the subscriber to move from London, U.K. to Hyderabad, India in less than two hours time, and deny the requested access to the subscriber's nomadic computing services.

FIG. 4 is a block diagram illustrating a block chain of subscriber location fingerprints for a plurality of global locations according to an embodiment of the present disclosure. A block chain is a distributed database of time-stamped records called "blocks." A block chain grows by adding a plurality of blocks, where each block is linked to the other blocks to form a chain. Each block in a block chain may be added by a different entity or device simply by linking a new block to previously recorded blocks. Because each block links to a previous block, and all blocks may be generated by differing devices, an early block within a block chain cannot be altered retroactively without altering all of the subsequent blocks that later followed and linked to that early block. This makes block chains inherently resistant to modification of each time-stamped record within the chain. A block chain based recording system may make transmission and authentication of data between a plurality of devices quicker, cheaper, and safer than traditional non-distributed systems with a central authentication server that may be hacked.

Upon receiving a request to access a subscriber's nomadic computing services, the location fingerprint security system may access a previously received and stored state variable for a mobile information handling system previously verified as being in use by the subscriber, indicating the last known position for the subscriber. The location fingerprint security system in such an embodiment may estimate the likely position of the subscriber at the time of the request to access the subscriber's nomadic computing services, based on the geographic location, velocity, and acceleration recorded in the previously received state variable, along with a confidence interval, indicating the accuracy of the estimation. The estimated likely position, along with an estimated velocity, acceleration, and confidence level may be referred to as a time-stamped subscriber location fingerprint.

As shown in FIG. 4, a table of subscriber location fingerprints 402 may include one or more subscriber location fingerprints 404, 406, 408, and 410. Each subscriber location fingerprint may include a timestamp indicating the time of estimation or measurement of the location of a subscriber, an estimated or measured position of the subscriber, an estimated or measured velocity of the subscriber, an estimated or measured acceleration of the subscriber, a most popular location for that subscriber, a second most popular location for that subscriber, and a confidence interval for the estimation of the subscriber's position, velocity, and acceleration, where relevant. Each table of subscriber location fingerprints 402 in an embodiment may be associated with only a single subscriber.

For example, as shown in FIG. 4, the block chain of subscriber location fingerprints 402 in an embodiment may include a subscriber location fingerprint 404 measuring the location of the subscriber in Chicago, U.S., travelling with a velocity of 350 km/h, and an estimated acceleration of 542 km/h$^2$ at a time of 16:30:27 GMT on Jun. 1, 2017. The subscriber location fingerprint 404 may also indicate the location fingerprint security system in such an embodiment has assigned a confidence interval of 0.01 meters to these state variables, indicating the subscriber should be located within a 0.01 meter radius of the estimated position given in subscriber location fingerprint 404. This type of measurement may occur when, for example, the subscriber is using her smart phone to access her nomadic computing services while taking off on a plane travelling directly to London. The location fingerprint security system may estimate the likely position of the subscriber mobile information handling system at a later time based on these measured state values.

The block chain of subscriber location fingerprints 402 may also include a most popular location of London, UK and a second most popular location of Chicago U.S. These most popular locations may be determined based upon recorded location histories for the subscriber or mobile information handling system, or may be based upon input received from the subscriber. The most popular location and second most popular location listed in each row of the table of subscriber location fingerprints 402 in an embodiment may match those entries in all other rows, because the most popular location and second most popular location do not vary for each individual subscriber, and each table of subscriber location fingerprints 402 applies to only one subscriber. In the example embodiment described with respect to FIG. 4, a most popular location of London, UK may indicate the subscriber resides in London, U.K., and a second most popular location of Chicago, U.S. may indicate the subscriber often commutes to Chicago, U.S. for business purposes.

As shown in FIG. 4, the block chain of subscriber location fingerprints 402 in an embodiment may include a subscriber location fingerprint 406 indicating that the location fingerprint security system has estimated that subscriber had an estimated position in New York, U.S., estimated velocity of 900 km/h, and an estimated acceleration of 5 km/h$^2$ at an estimation time of 19:00:18 GMT on Jun. 1, 2017. The estimated position of New York may be determined based upon the velocity, acceleration, and direction in which the mobile information handling system was travelling at the measurement time of 16:59:27 described directly above (which indicated the mobile information handling system may be travelling aboard a high-speed aircraft). The subscriber location fingerprint 406 may also indicate the location fingerprint security system in such an embodiment has assigned a confidence interval of 3,000 kilometers to these state variable estimations, indicating the subscriber should be located within a 3,000 km radius of the estimated position given in subscriber location fingerprint 406. This confidence interval may have a higher value than the confidence interval of 0.01 m associated with subscriber location fingerprint 404 in recognition of the fact that the last measured velocity and acceleration of the mobile information handling system had a high value. Because the velocity and acceleration of the mobile information handling system were high at the last known measurement, and because the direction of travel for the mobile information handling system could have changed significantly during the two hours that elapsed between that measurement and the estimation of location shown in the subscriber location fingerprint 406, the location fingerprint security system in an embodiment may not be able to determine the location of the subscriber mobile information handling system with as much precision as in a situation in which the mobile information handling system was last measured more recently or was measured as having zero velocity, or in a stationary position. Consequently, the radius in which the location fingerprint security system may locate the mobile information handling system may be markedly larger.

As shown in FIG. 4, the block chain subscriber location fingerprints 402 in an embodiment may include a subscriber location fingerprint 408 indicating that the location fingerprint security system has estimated that subscriber had an estimated position in London, U.K., estimated velocity of 0 km/h, and an estimated acceleration of 0 km/h$^2$ at an estimation time of 07:48:16 GMT on Jun. 2, 2017. The estimated position of London may be determined based upon the velocity, acceleration, and direction in which the mobile information handling system was travelling at the measurement time of 19:24:18 of the night before, described directly above (which indicated the mobile information handling system may be travelling aboard a high-speed aircraft), as well as upon the identification of London, UK as the most popular location. The subscriber location fingerprint 408 may also indicate the location fingerprint security system in such an embodiment has assigned a confidence interval of 1 meter to these state variable estimations, indicating the subscriber should be located within a meter radius of the estimated position given in subscriber location fingerprint 408. This confidence interval may have a higher value than the confidence interval of 0.01 meters associated with subscriber location fingerprint 404 in recognition of the fact that subscriber location fingerprint 404 is the result of an actual measurement of the location of the subscriber, rather than an estimation.

FIG. 5 is a graphical diagram illustrating a plurality of geographical locations within a city of one or more information handling systems according to an embodiment of the present disclosure. FIG. 5 may represent a map of several city blocks, where a plurality of mobile edge computing gateway devices service the area. For example, as shown in FIG. 5, a first mobile edge computing gateway device may service the area 502, a second mobile edge computing gateway device may service the area 504, and a third mobile edge computing gateway device may service the area 506.

As also shown in FIG. 5, multiple location measurements for one or more mobile information handling systems in an embodiment may be recorded within the areas 502-506 serviced by mobile edge computing gateway devices 1-3. For example, a state variable 1 508 in an embodiment may be measured at a first location within network area 502 from a first mobile information handling system, such as a smart phone. State variable 1 508 in an embodiment may also record the smart phone moving at a velocity equivalent to a brisk walk (e.g. 3 km/h). In an embodiment, the smart phone may already have been verified as being in use by a subscriber to the nomadic computing services system.

As another example, a state variable 2 510 in an embodiment may be measured at a second location within network area 504 shortly after the recording of the first state variable state 1 508. State variable 2 510 in an embodiment may place the same smart phone whose location was recorded at state 1 508 within the network area 504, directly adjacent to the network area 502 within which state 1 508 was recorded, with a velocity matching the velocity measured at state 1 508 (e.g. 3 km/h). Such a scenario may occur, if, for example, a subscriber accessing nomadic computing services on her smart phone is walking from home to her office, and in doing so, passes from a first network 502 serviced by a first mobile edge computing gateway device to a second network 504 serviced by a second mobile edge computing gateway device. As described above, in such a scenario, at the time the user passes between network areas 502 and 504, although the first mobile edge computing gateway device has already verified the user of the smart phone is the authorized subscriber, the second mobile edge computing gateway device in an embodiment may still need to verify the user of the smart phone is the authorized subscriber before allowing the smart phone to access the subscriber's nomadic computing services via the second mobile edge computing gateway device.

In another example, a state variable 3 512 in an embodiment may measure the location of a laptop computer at a third location within network area 504, a short time after the recording of the second state variable state 2 510. State variable 3 512 in an embodiment may record a zero velocity for the laptop computer, indicating it is currently stationary. Such a scenario may occur, for example, when the user of the smart phone (the previously verified subscriber) reaches her office within network area 504 and switches from using her smart phone to using her laptop. In such a scenario, the second mobile edge computing gateway device in an embodiment may need to verify the user of the laptop is the authorized subscriber before allowing the laptop to access the subscriber's nomadic computing services via the second mobile edge computing gateway device.

In yet another example, a state variable 4 512 in an embodiment may be measured at a fourth location within network area 506, a considerable distance from the location measured at state 2 510. State variable 4 514 in an embodiment may be measured at the same time as the measured state 3 512, and may measure the location of a tablet device. This scenario may occur if, for example, a user other than the authorized subscriber attempts to access the subscriber's private data and nomadic computing services at another location.

Figure 6:
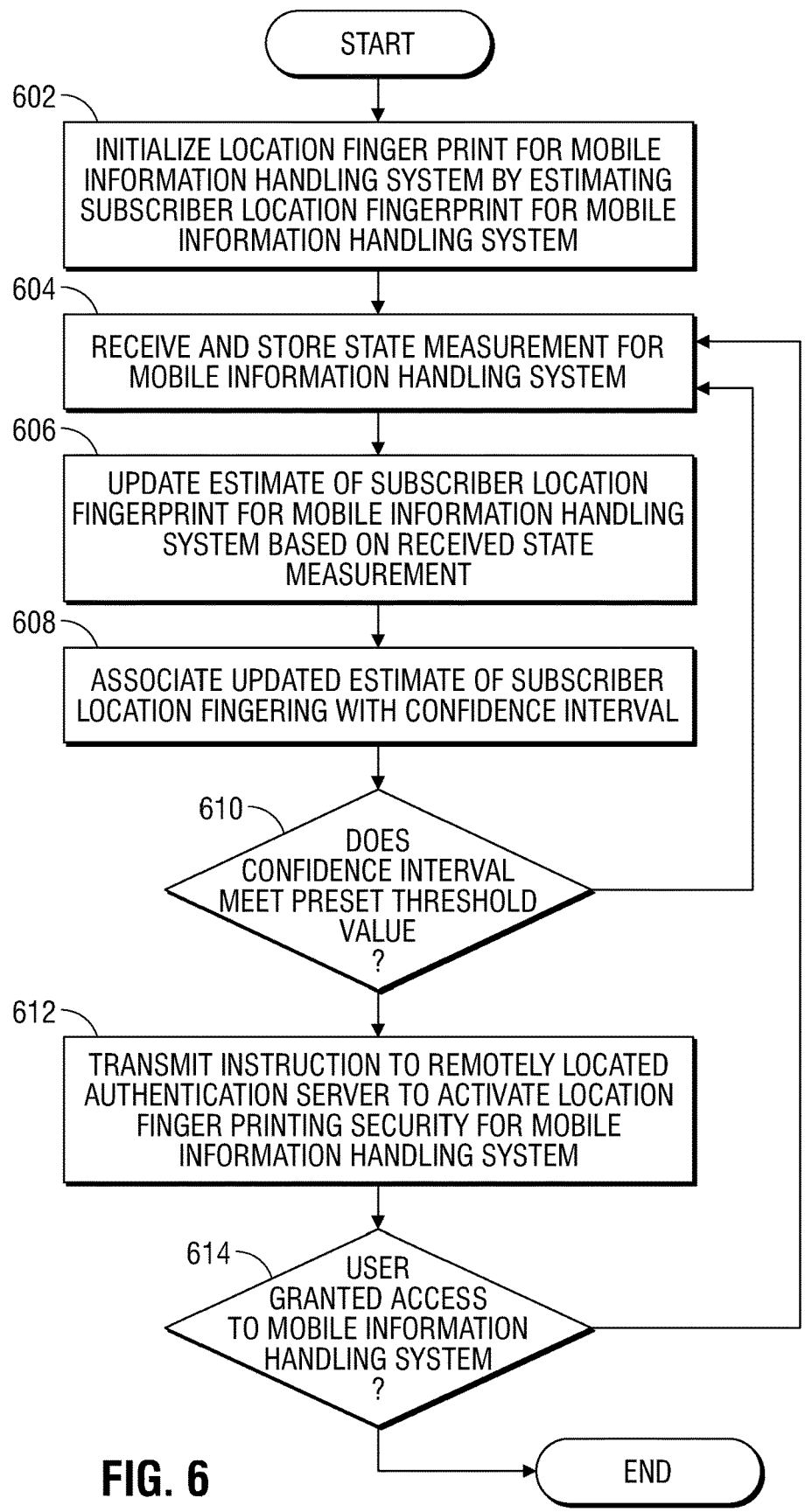
FIG. 6 is a block diagram illustrating a block chain of subscriber location fingerprints according to an embodiment of the present disclosure.

FIG. 6 is a block diagram illustrating a block chain of subscriber location fingerprints for locations within a single city according to an embodiment of the present disclosure. As shown in FIG. 6, a block chain of subscriber location fingerprints 602 may include one or more subscriber location fingerprints 604, 606, and 608. Each subscriber location fingerprint may include a timestamp indicating the time of estimation or measurement of the location of a subscriber, an estimated or measured position of the subscriber, an estimated or measured velocity of the subscriber, an estimated or measured acceleration of the subscriber, a most popular location for that subscriber, a second most popular location for that subscriber, and a confidence interval for the estimation of the subscriber's position, velocity, and acceleration, where relevant. Each block chain of in an embodiment may be associated with a single subscriber. Groups of subscribers may be associated with a single block chain in other embodiments.

For example, as shown in FIG. 6, the block chain of subscriber location fingerprints 602 in an embodiment may include a subscriber location fingerprint 604 measuring the location of the subscriber at GPS coordinates 40.73324, and −73.98 degrees, travelling with a velocity of 3 km/h, and an estimated acceleration of 0 km/h$^2$ at a time of 16:30:27 GMT on Jun. 1, 2017. The subscriber location fingerprint 604 may also indicate the location fingerprint security system in such an embodiment has assigned a confidence interval of 0.01 meters to these state variables, indicating the subscriber should be located within a 0.01 meter radius of the estimated position given in subscriber location fingerprint 604. This type of measurement may occur when, for example, the subscriber is using her smart phone to access her nomadic computing services while walking from her home to her office. The location fingerprint security system may estimate the likely position of the subscriber mobile information handling system at a later time based upon these state values. The block chain of subscriber location fingerprints 602 may also include a most popular location of 40.73324, and −73.98 degrees that may represent the location of her home, and a second most popular location of 40.7354, and −73.97 degrees that may represent the location of her office.

As shown in FIG. 6, the block chain of subscriber location fingerprints 602 in an embodiment may include a subscriber location fingerprint 606 indicating that the location fingerprint security system has estimated that subscriber had an estimated position of 40.73324, and −74 degrees, an estimated velocity of 3 km/h, and an estimated acceleration of 0 km/h$^2$ at an estimation time of 16:35:18 GMT on Jun. 1, 2017. The estimated position (located between her home and office locations) may be determined based upon the velocity, acceleration, and direction in which the mobile information handling system was travelling at the measurement time of 16:30:27 described directly above, and/or upon the description of her home and office locations as most popular and second most popular locations. The subscriber location fingerprint 606 may also indicate the location fingerprint security system in such an embodiment has assigned a confidence interval of 1 meter to these state variable estimations, indicating the subscriber should be located within a 1 m radius of the estimated position given in subscriber location fingerprint 606. This confidence interval may have a higher value than the confidence interval of 0.01 meters associated with subscriber location fingerprint 604 in recognition of the fact that subscriber location fingerprint 604 is the result of an actual measurement of the location of the subscriber, rather than an estimation.

As shown in FIG. 6, the block chain subscriber location fingerprints 602 in an embodiment may include a subscriber location fingerprint 608 indicating that the location fingerprint security system has estimated that subscriber had an estimated position at 40.7354, and −73.97 degrees, an estimated velocity of 0 km/h, and an estimated acceleration of 0 km/h$^2$ at an estimation time of 16:40:16 GMT on Jun. 1, 2017. The estimated position (located at her office location) may be determined based upon the velocity, acceleration, and direction in which the mobile information handling system was travelling at the measurement time of 16:35:18, described directly above (which indicated the mobile information handling system may be travelling aboard a high-speed aircraft), as well as upon the identification of her office (whose location matches the estimated position for block 608) as the most popular location. The subscriber location fingerprint 608 may also indicate the location fingerprint security system in such an embodiment has assigned a confidence interval of 1 meter to these state variable estimations, indicating the subscriber should be located within a meter radius of the estimated position given in subscriber location fingerprint 608. This confidence interval may have a higher value than the confidence interval of 0.01 meters associated with subscriber location fingerprint 604 in recognition of the fact that subscriber location fingerprint 604 is the result of an actual measurement of the location of the subscriber, rather than an estimation.

Figure 7:
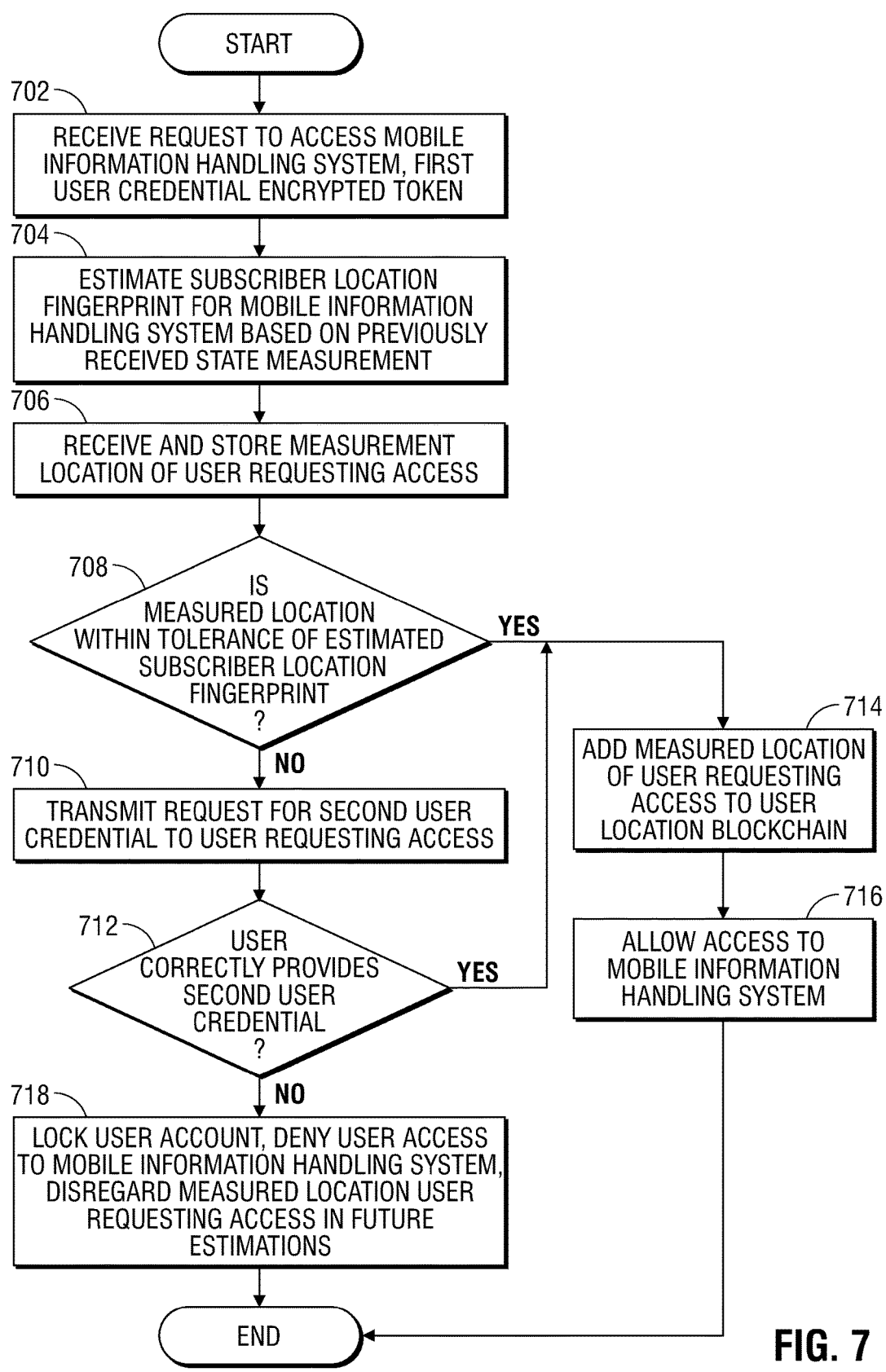
FIG. 7 is a flow diagram illustrating a method of initiating security measures of a location fingerprint security system according to an embodiment of the present disclosure.

FIG. 7 is a flow diagram illustrating a method of initiating security measures of a location fingerprint security system and storing confirmed future estimations of a subscriber location according to an embodiment of the present disclosure. At block 702, the location fingerprint security system may be initialized by estimating a subscriber location fingerprint for a mobile information handling system verified as currently in use by the subscriber. This initializing first estimate in an embodiment need not be accurate, as it forms the basis for updates designed to increase accuracy of later estimations, as described in greater detail above. As an example, this initializing first estimate in an embodiment may include the location of the sale of the mobile information handling system, or the location of the manufacture of the mobile information handling system or a portion thereof. In an embodiment, the estimated subscriber location fingerprint may be stored in a memory operably connected to the location fingerprint security system in, for example, a block chain of subscriber location fingerprints, as described above.

At block 704, in an embodiment, the location fingerprint security system may receive and store a state measurement for the mobile information handling system verified to be in use by the subscriber. The mobile information handling system may include a GPS logic circuit capable of recording and transmitting a measured GPS geographical location, velocity, and acceleration of the mobile information handling system. Upon receipt of these measured state variables, the location fingerprint security system in an embodiment may store the state variables in a block chain of measured state conditions, as described in greater detail above.

At block 706, in an embodiment, the location fingerprint security system may update the estimate of the subscriber location fingerprint for the mobile information handling system based on the received state measurement. In an embodiment, the location fingerprint security system may access the state measurement for mobile information handling system received and stored at block 704. The location fingerprint security system may then use a linear-quadratic estimation to produce estimates of current state variables based upon those previously measured state variables. The estimated state variables may include an estimated position, estimated velocity, and estimated acceleration. More specifically, the location fingerprint security system may use a Kalman filter to perform this estimation.

At block 708, in an embodiment, the location fingerprint security system in an embodiment may associate the updated estimate of subscriber location fingerprint with a confidence interval. In addition to estimated state variables, the Kalman filter process may provide a confidence interval describing the calculated accuracy of these estimations. As described above, the location fingerprint security system may calculate a confidence interval of a specified distance, indicating the location fingerprint security system estimates the mobile information handling system may be located somewhere within a radius having the length of the confidence interval from the estimated location of the mobile information handling system. For example, as described above with respect to FIG. 4, the location fingerprint security system may estimate a mobile information handling system is located within a 1 meter radius of a GPS location within London, UK at 07:48:16 on Jun. 2, 2017. As another example, and as also described above with respect to FIG. 6, the location fingerprint security system may estimate another mobile information handling system is located within a 1 meter radius of a GPS location 40.73324, −74.0 degrees at 16:35:18 on Jun. 1, 2017.

As shown in FIG. 7, at block 710, in an embodiment, the location fingerprint security system may determine whether the confidence interval meets a preset threshold value. As described above, the confidence interval in an embodiment may describe the accuracy assigned to the estimation of the mobile information handling system state variables. As the confidence interval increases, the accuracy of the estimations correspondingly decreases. For example, as described above, the location fingerprint security system may provide an estimated location with a high confidence interval in a scenario in which the measured state variables used to make such an estimation indicated the mobile information handling system was moving at a high velocity or high acceleration. In such a scenario, or in a scenario in which a long period of time elapses between receipt of the measured state variables and estimation of current state variables, the mobile information handling system may have changed direction and/or moved a great distance away from the measured location. Estimations of location made in those types of scenarios may be associated with a higher confidence interval because the radius in which the location fingerprint security system may locate the mobile information handling system may be markedly larger.

If the location fingerprint security system in an embodiment cannot accurately estimate the location of the mobile information handling system, there is a risk of granting access only to users who establish their locations nearby the estimated location of the subscriber and may result in rejecting access to authenticated users who should be granted access. Similarly, failure to accurately estimate the location also risks granting access to users located far from the actual coordinates of the mobile information handling system who are not actually authorized to access the system. As a consequence, the location fingerprint security system in an embodiment may only impose security restrictions based on the estimated location fingerprints if those estimations meet a preset threshold for accuracy. For example, the location fingerprint security system in an embodiment may only activate the location finger printing security measures if the confidence interval meets a preset threshold value. For example a preset threshold value may set as 1 meter, 5 meters, or 20 meters in some embodiments. Other preset threshold values are contemplated, and may vary or be set according to factory settings, received user inputs, or based on aggregated historical data showing past location patterns for the mobile information handling system. For example, a graphical user interface setting or other input setting may be available to adjust sensitivity and being set by a user or an administrator. If the confidence interval meets the preset threshold value in an embodiment, the method may proceed to block 712. If the confidence interval does not meet the preset threshold value in an embodiment, the method may proceed back to block 704 in order to increase the accuracy of estimations until the location fingerprint security system may estimate a location with a confidence interval that does meet the preset threshold value.

At block 712, in an embodiment, the location fingerprint security system within a mobile edge gateway device may transmit an instruction to a remotely located authentication server to activate the location finger printing security for the subscriber. As described above, the mobile information handling system may be in communication within a network with a mobile edge computing gateway device, which may also be operating in a network with the cloud. The remotely located authentication server may be located within the cloud in embodiments of the present disclosure, or within another mobile edge computing gateway device in communication via the cloud. In such an embodiment, the memory storing each of the block chains associated with the subscriber may be located at the remotely located authentication server. In an embodiment where the memory storing each of the block chains associated with the subscriber is located within the mobile edge computing gateway, the location fingerprint security system may not need to transmit an instruction to activate the location finger printing security for the subscriber.

Once the location finger print security measures have been activated, the mobile edge computing gateway in an embodiment may associate the subscriber with a block chain, and encrypt each of the blocks or records within the block chain. In such an embodiment, the mobile edge computing gateway may transmit an encryption key to the subscriber's mobile information handling system for use in decrypting the subscriber's block chains later, as described in greater detail below. In another embodiment, the memory may be located at a remotely located authentication server, and the remotely located authentication server may associate the subscriber with a block chain, encrypt each of the blocks within that block chain, and transmit the encryption key to the mobile edge computing gateway to forward on to the subscriber's mobile information handling system.

At block 714, in an embodiment, a subscriber may be granted access to her nomadic computing services at the gateway. As described in greater detail below, the security measures put in place by the location fingerprint security system may only grant access to a subscriber's nomadic computing services if the location of the information handling system requesting access is determined to lie within a radius of an estimated location for the subscriber, and the radius is equal to or less than the confidence interval associated with that estimated location. If the information handling system requesting access can establish it is co-located with the estimated position of the subscriber, the location fingerprint security system may assume the requesting information handling system is in use by the authorized subscriber. In such a scenario, the location fingerprint security system may also assume its estimation of the subscriber was correct, and may store that estimated location (or estimated state variable, including position, velocity, and acceleration) as a measured state variable for the subscriber in the form of a block added to the block chain of subscriber location fingerprints, as described in greater detail above. An oldest block may be rejected from the block chain with addition of the new block in some embodiments.

Figure 8:
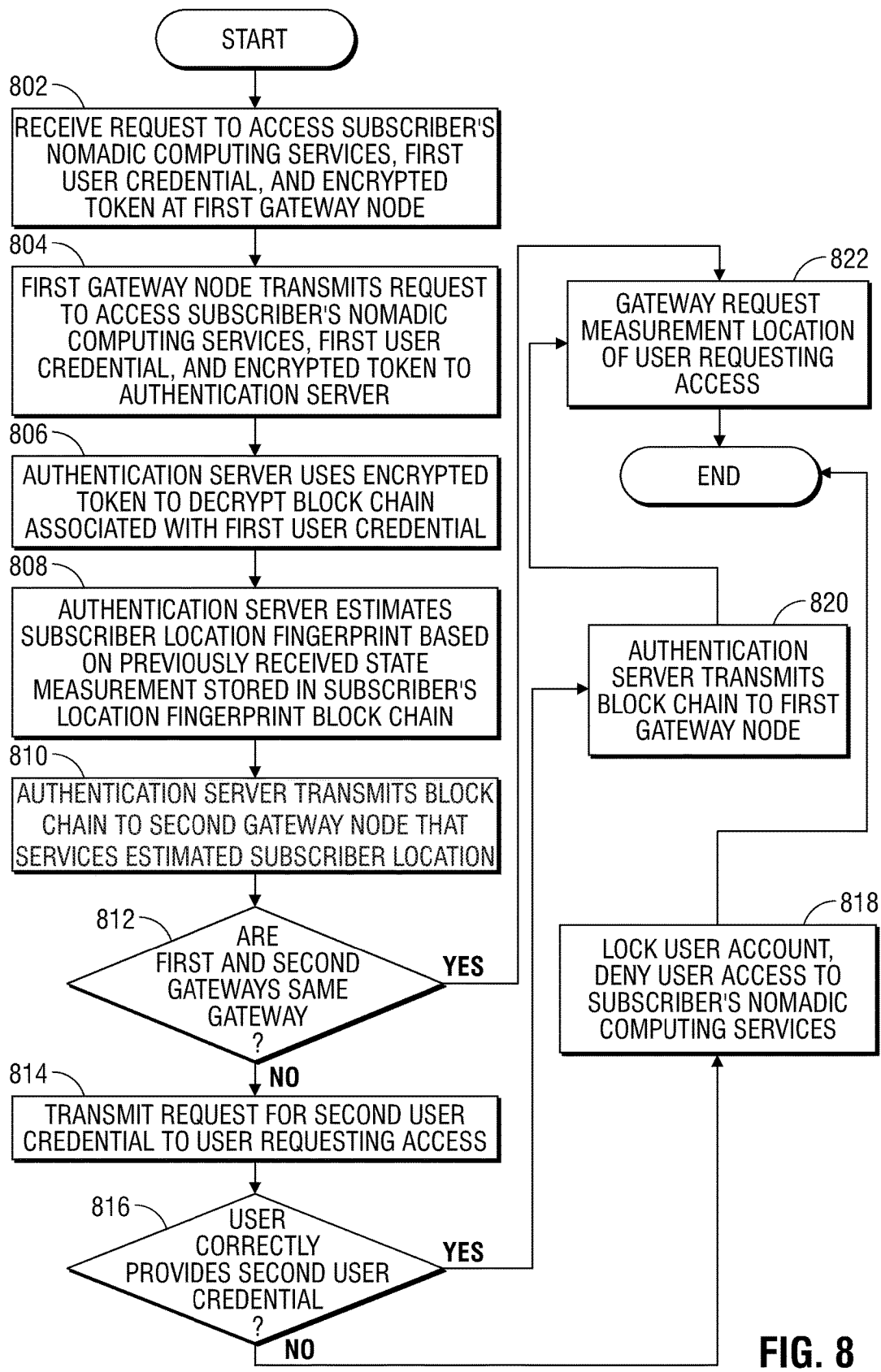
FIG. 8 is a flow diagram illustrating a method of transmitting a subscriber block chain to a gateway device according to an embodiment of the present disclosure.

FIG. 8 is a flow diagram illustrating a method of transmitting a subscriber block chain to a gateway servicing an area including an estimated current location of the subscriber according to an embodiment of the present disclosure. At block 802, in an embodiment, a location fingerprint security system operating at a first gateway node may receive a request to access a subscriber's nomadic computing services, a first user credential, and an encrypted token. For example, with reference to the embodiment described in FIG. 5, the gateway node servicing area 504 may receive a request to access a subscriber's nomadic computing services, a first user credential, and an encrypted token. As another example, and also with reference to the embodiment described in FIG. 5, the gateway node servicing area 506 may receive a request to access the same subscriber's nomadic computing services, the first user credential, and the encrypted token. The location fingerprint security system in an embodiment may receive the request, the first user credential, and the encrypted token from an information handling system that has not yet been established as being operated by the authorized subscriber, and may, in fact, be a remote hacker. The first user credential in an embodiment may be some form of user identification, including, but not limited to a password, a username, an IP address, a fingerprint, a retinal scan, a facial recognition ID, a voice recognition ID, or any other type of user identification known in the art. In an aspect where the information handling system has been previously established, a user credential may be an IP address, or a facial, voice, or retinal scan, which can be observed passively, so that the subscriber is not required to take affirmative steps to identify herself after an initial authentication of the mobile information handling system has been established. Further, the gateway device may use the encrypted token to decrypt the block chain of subscriber location fingerprints associated with that subscriber.

As shown in FIG. 8 at block 804, the first gateway node in an embodiment may transmit the request to access the subscriber's nomadic computing services, first user credential, and encrypted token to an authentication server. The authentication server in an embodiment may store within a memory located at the authentication server a plurality of location block chains or records of previously recorded or estimated locations of the subscriber. The authentication server in an embodiment may also encrypt each location block chain stored in its memory.

At block 806, in an embodiment, the authentication server may use the first user credential to identify the block chain associated with a specific user, and may use the encryption token received from the first gateway node to decrypt the identified block chain. If the decryption key provided by the requesting subscriber is forged or incorrect, the authentication server in an embodiment may fail to decrypt the block chain and may deny the requesting user access to the subscriber's nomadic computing services. In other embodiments in which the location fingerprint security system is executed within the mobile edge computing gateway device, the mobile edge computing gateway device, rather than the authentication server may store the subscriber block chains, and may perform this step.

At block 808, in an embodiment, the authentication server may estimate the subscriber's location based on previously received state measurements stored in the subscriber's location fingerprint block chain. As a first example, with reference to FIG. 5, the gateway node serving area 504 may receive a request to access the subscriber's nomadic computing services, and the authentication server may have stored previous measurements of the subscriber at state 1 508 within area 502. This stored state measurement in an embodiment may constitute a block within a stored subscriber's block chain. Upon identifying that subscriber's block chain and decrypting this stored state measurement, as described directly above, at block 808, in an embodiment, the authentication server may estimate a current location of the subscriber based on these stored state measurements. This state measurement may include a measurement of the subscriber's position, velocity, and acceleration. In this first example embodiment described with reference to FIG. 5, the authentication server may estimate the subscriber's location based on state measurement 1 508 as being at estimated state 2 510, within the area 504.

In a second example embodiment, also with reference to FIG. 5, the gateway node serving area 506 may receive a request to access the subscriber's nomadic computing services, a and the authentication server may have stored previous measurements of the subscriber at state 1 508 within area 502 and at state 2 510 within area 504. In this second example embodiment described with reference to FIG. 5, the authentication server may estimate the subscriber's location based on state measurement 1 508 and state measurement 2 510 as being at estimated state 3 512, within the area 504. In other embodiments in which the location fingerprint security system is executed within the mobile edge computing gateway device, the mobile edge computing gateway device, rather than the authentication server may store the subscriber block chains, and may perform this step.

In estimating a subscriber's current state in an embodiment, the location fingerprint security system operating in part at an authentication server may use a linear-quadratic estimation to produce estimates of current state variables based upon previously measured state variables, including an estimated position, estimated velocity, and estimated acceleration. More specifically, the location fingerprint security system may use a Kalman filter to perform this estimation. Further, the location fingerprint security system in an embodiment may associate the estimate of the subscriber location with a confidence interval indicating the location fingerprint security system estimates the subscriber may be located within a radius having the length of the confidence interval from the estimated location of the subscriber. For example, as described above with respect to FIG. 4, the location fingerprint security system may estimate a subscriber is located within a 3,000 km radius of a location in New York, US at 19:24:18 on Jun. 1, 2017, and within a one meter radius of a location in London, UK at 07:48:16 on Jun. 2, 2017. As another example, as described above with respect to FIG. 6, the location fingerprint security system may estimate another subscriber is located within a 1 meter radius of GPS coordinates 40.73324, and −74.0 degrees at 16:35:18 on Jun. 1, 2017 and within a 1 meter radius of GPS coordinates 40.7354, and −73.94 degrees at 16:40:16 on Jun. 1, 2017. As yet another example, in an embodiment, the measurement of the mobile information handling system's location may be performed by identifying the mobile information handling system's distance from two or more gateways, or between a gateway and a base station operating within the same network, and using these measured distances to triangulate the position of the mobile information handling system.

At block 810, in an embodiment the authentication server may transmit the decrypted block chain associated with the authorized user to the second gateway node servicing the area including the subscriber's currently estimated location. For example, in the first example embodiment described with reference to FIG. 5, the authentication server may transmit the decrypted block chain associated with the authorized user to the gateway node servicing the area 504, including the subscriber's currently estimated location at state 2 510. The decrypted block chain may include the estimated position, velocity, and acceleration of state 2 510, as well as a confidence interval describing the accuracy of those estimations. The confidence interval in such an embodiment may comprise, for example, a radius in meters surrounding the estimated location, indicating the location fingerprint security system, when accounting for potential estimation errors, locates the subscriber within the confidence interval radius of the estimated location. As another example, and in the second example embodiment described with reference to FIG. 5, the authentication server may transmit the decrypted block chain associated with the authorized user to the gateway node servicing the area 504, including the subscriber's currently estimated location at state 3 512.

At block 812, in an embodiment, it is determined whether the first and second gateways are the same gateway. As described above, the first gateway node receives the request to access the subscriber's nomadic computing services from a mobile information handling system within the first gateway node's service area. However, the request may come from the authorized subscriber, or from an unauthorized subscriber posing as the authorized subscriber. In order to avoid security breaches by unauthorized subscribers in such a way, the location fingerprint security system in an embodiment may transmit the decrypted location fingerprint block chain to the gateway node in which the authentication server has estimated the authorized subscriber is currently located. If the estimated location is located in a different area than the location from which the requesting subscriber submitted the request for access, the gateway node that received the request for access in an embodiment may not receive the decrypted location fingerprint block chain, and may not grant the requesting subscriber access to the authenticated subscriber's nomadic computing services.

For example, in the first scenario described above with reference to FIG. 5, if the gateway node servicing area 504 receives a request from a mobile information handling system located at state 3 512 to access the nomadic computing services of the authorized user associated with the block chain that includes state 1 508, the authentication server in such an embodiment may estimate the current location of the authorized subscriber at state 2 510 based on the earlier recorded state measurement of state 1 508, and transmit the decrypted block chain for that authorized subscriber to the gateway servicing area 504. In such an embodiment, the first gateway that received the request for access may be the gateway node servicing area 504, and the second gateway that is servicing the area that includes the estimated current location of the authorized subscriber at state 2 510 may also be the gateway node servicing area 504. In other words, in such a scenario, the first gateway and the second gateway are the same device.

As another example, in the second scenario described with reference to FIG. 5 above, if the gateway node servicing area 506 receives a request from a mobile information handling system located at state 4 514 to access the nomadic computing services of the authorized user associated with the block chain that includes state 1 508 and state 2 510, the authentication server in such an embodiment may estimate the current location of the authorized subscriber at state 3 512 based on the earlier recorded state measurements of state 1 508 and state 2 510, and transmit the decrypted block chain for that authorized subscriber to the gateway servicing area 504. In such an embodiment, the first gateway that received the request for access may be the gateway node servicing area 506, and the second gateway that is servicing the area that includes the estimated current location of the authorized subscriber may be the gateway node servicing area 504. In other words, in such a scenario, the first gateway and the second gateway are not the same device. If the first gateway and the second gateway are not the same device in an embodiment, the method may proceed to block 814. If the first gateway and the second gateway are the same device in an embodiment, the method may proceed to block 822.

At block 814, in an embodiment, if the first and second gateways are not the same device, the location fingerprint security system in an embodiment may transmit from the first gateway node a request for and receive a second user credential. As described above, if the first gateway node and second gateway node are not the same device, this may indicate to the authentication server that the requesting subscriber may not be the authorized subscriber. By requesting a second user credential, the authentication server in an embodiment may provide the requesting subscriber to prove, by providing further identifying information, that it is, in fact, the authorized subscriber. In other embodiments in which the location fingerprint security system is executed within the mobile edge computing gateway device, the mobile edge computing gateway device, rather than the authentication server may store the subscriber block chains, and may perform this step.

The location fingerprint security system in an embodiment, after determining the requesting information handling system does not fall within the estimated location of the subscriber, may request further information from the requesting information handling system identifying the user of the requesting information handling system as the subscriber. For example, a challenge to the user may be sent for a login password for a required authentication code. The authentication code, for example, may be sent to a known e-mail or text address in an embodiment. A login may be established previously, however, in some embodiments. Other security challenges known in the art may be used according to various embodiments.

At block 816, the location fingerprint security system in an embodiment may determine whether the user requesting access correctly provided a second user credential. In other embodiments in which the location fingerprint security system is executed within the mobile edge computing gateway device, the mobile edge computing gateway device, rather than the authentication server may store the subscriber block chains, and may perform this step. A second user credential could include any form of user identification not already used as the first user credential in block 802, as described above. The second user credential could include, but not be limited to a password, a username, an IP address, a fingerprint, a retinal scan, a facial recognition ID, a voice recognition ID, or any other type of user identification known in the art, as well as the correct answer to a preset verification question. If the location fingerprint security system determines the user has correctly provided a second user credential identifying the user as an authorized subscriber, the method may proceed to block 820. If the location fingerprint security system determines the user has not correctly provided a second user credential identifying the user as an authorized subscriber, the method may proceed to block 818.

At block 818, in an embodiment, the location fingerprint security system operating at the authentication server may lock the user account, denying access to the subscriber's nomadic computing services from any requesting mobile information handling system. If the user of the information handling system requesting access is not located in the service area of the gateway where the authentication server has estimated the authenticated subscriber is currently located, as determined above at block 812, or if the user of the information handling system requesting access cannot establish it is the authorized subscriber by supplying a correct second user credential, as determined above at block 816, the location fingerprint security system may also assume the requesting information handling system is not being operated by the authorized subscriber, and that the subscriber's nomadic computing services are currently under attack from a malicious remote hack. In such a scenario, the location fingerprint security system operating at the authentication server in an embodiment may lock the user account by denying access to the subscriber's nomadic computing services to any information handling system requesting access.

As described above, in a scenario in which the location fingerprint security system has granted access to an information handling system determined to be operated by an authorized subscriber, the location fingerprint security system in an embodiment may add the measured location of the requesting user to that subscriber's block chain of subscriber location fingerprints. In contrast, in block 818, in a scenario where the location fingerprint security system denies access to the requesting information handling system, it has done so because it cannot be determined that the measured location of the requesting information handling system is the same as the estimated location of the subscriber. As a consequence, in such a scenario, the location fingerprint security system in an embodiment may not store the measured location of the requesting information handling system within that subscriber's block chain of subscriber location fingerprints, and may disregard that measured location of the requesting information handling system when performing future estimations of the subscriber's location. In other embodiments in which the location fingerprint security system is executed within the mobile edge computing gateway device, the mobile edge computing gateway device, rather than the authentication server may store the subscriber block chains, and may perform this step.

At block 820, in an embodiment, the authentication server may transmit the decrypted block chain associated with the authorized user to the first gateway node. As described above, if the first gateway node and second gateway node are not the same device, indicating the requesting subscriber may not be the authorized subscriber, the authentication server in an embodiment may provide the requesting subscriber to prove it is the authorized subscriber by providing a second user credential positively identifying it as the authorized subscriber. If the requesting user correctly provides such a second user credential, as described above at block 816, the authentication server in an embodiment may transmit the decrypted block chain associated with the authorized user to the second gateway node which received the request to access the authenticated subscriber's nomadic computing services.

For example, in the embodiment described with reference to FIG. 5, if the gateway node servicing area 506 receives a request from a mobile information handling system located at state 4 514 to access the nomadic computing services of the authorized user associated with the block chain that includes state 1 508 and state 2 510, the authentication server in such an embodiment may estimate the current location of the authorized subscriber at state 3 512 based on the earlier recorded state measurements of state 1 508 and state 2 510, and transmit the decrypted block chain for that authorized subscriber to the gateway servicing area 504. In such an embodiment, the first gateway that received the request for access may be the gateway node servicing area 506, and the second gateway that is servicing the area that includes the estimated current location of the authorized subscriber may be the gateway node servicing area 504. In other words, in such a scenario, the first gateway and the second gateway are not the same device. If the first gateway and the second gateway are not the same device in such an embodiment, but the requesting subscriber correctly provides a second user credential, the authentication server may transmit the decrypted block chain including state measurements 1 508, and 2 510, and estimated state 3 512 to the gateway servicing area 506.

At block 822, in an embodiment the gateway that is in receipt of the decrypted block chain associated with the authenticated subscriber may request a location measurement from the mobile information handling system requesting access to the authenticated subscriber's nomadic computing services. This may occur in two separate situations, including a scenario in which the first and second gateway are determined to be the same device at block 812, and a scenario in which the first and second gateway are determined to not be the same device at block 812, but it is determined at block 816 that the requesting user has correctly provided a second user credential.

For example, in the first scenario described above with reference to FIG. 5, if the gateway node servicing area 504 receives a request from a mobile information handling system located at state 3 512 to access the nomadic computing services of the authorized user associated with the block chain that includes state 1 508, the authentication server in such an embodiment may estimate the current location of the authorized subscriber at state 2 510 based on the earlier recorded state measurement of state 1 508, and transmit the decrypted block chain for that authorized subscriber to the gateway servicing area 504. In such an embodiment, the first gateway that received the request for access may be the gateway node servicing area 504, and the second gateway that is servicing the area that includes the estimated current location of the authorized subscriber at state 2 510 may also be the gateway node servicing area 504. In such a embodiment, the gateway node servicing area 504 may then transmit a request to the mobile information handling system requesting access to provide a current measurement of its location.

As another example, in the second scenario described with reference to FIG. 5 above, if the gateway node servicing area 506 receives a request from a mobile information handling system located at state 4 514 to access the nomadic computing services of the authorized user associated with the block chain that includes state 1 508 and state 2 510, the authentication server in such an embodiment may estimate the current location of the authorized subscriber at state 3 512 based on the earlier recorded state measurements of state 1 508 and state 2 510, and transmit the decrypted block chain for that authorized subscriber to the gateway servicing area 504. In such an embodiment, the first gateway that received the request for access may be the gateway node servicing area 506, and the second gateway that is servicing the area that includes the estimated current location of the authorized subscriber may be the gateway node servicing area 504. In other words, in such a scenario, the first gateway and the second gateway are not the same device. In such an embodiment, if the user can correctly provide a second user credential, the gateway servicing area 506 may request a current location measurement for the mobile information handling system requesting access to the authorized subscriber's nomadic computing resources.

Figure 9:
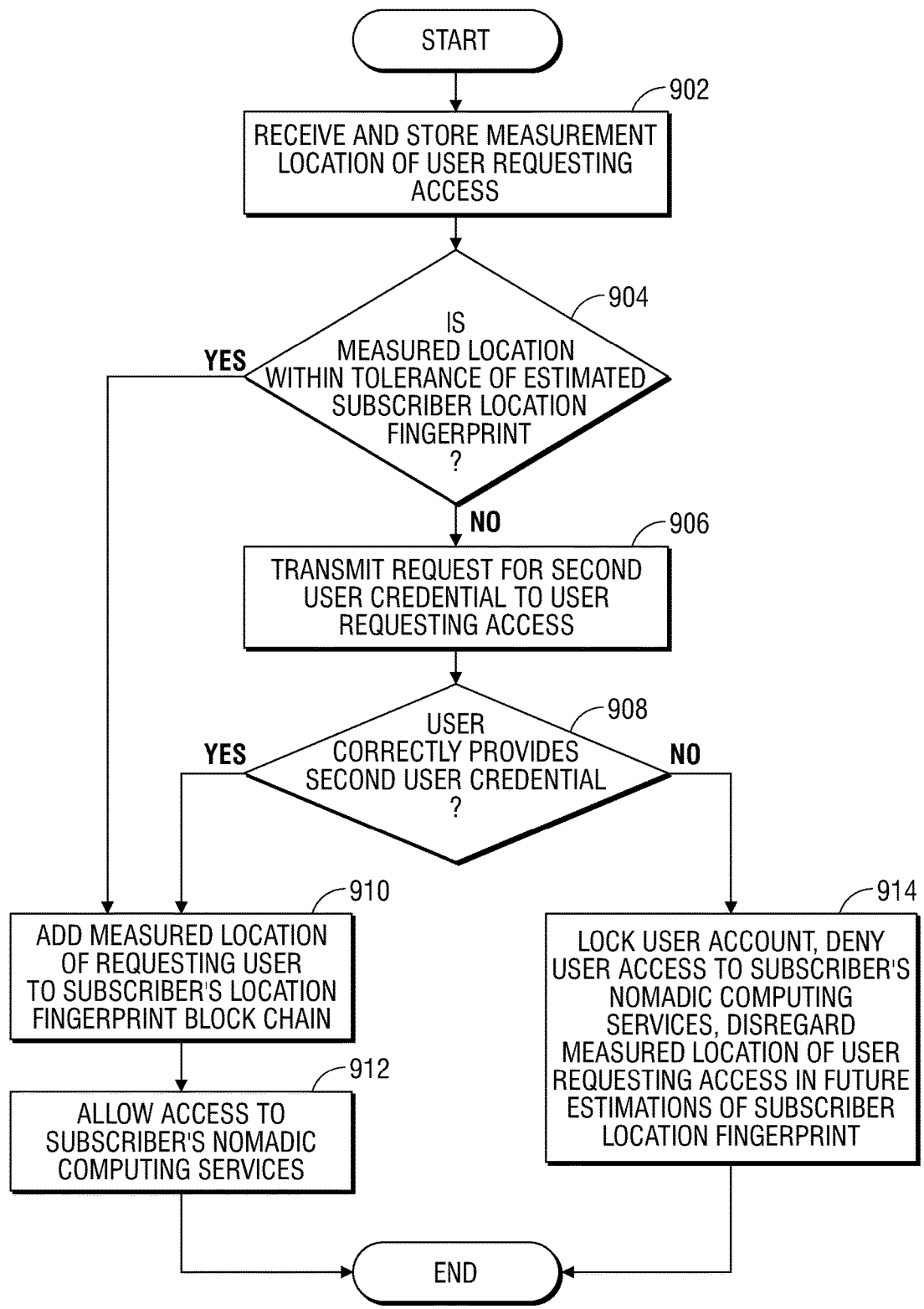
FIG. 9 is a flow diagram illustrating a method of granting access to a mobile information handling system determined to be co-located with an authorized subscriber according to an embodiment of the present disclosure.

FIG. 9 is a flow diagram illustrating a method of granting access to a subscriber's nomadic computing services to a mobile information handling system determined to be co-located with an estimated location of the authorized subscriber according to an embodiment of the present disclosure. At block 902, in an embodiment, the location fingerprint security system may receive and store a measurement location of the information handling system requesting access to the subscriber's nomadic computing services. For example, in the first scenario described above with reference to FIG. 5, if the gateway node servicing area 504 receives a request from a mobile information handling system located at state 3 512 to access the nomadic computing services of the authorized user associated with the block chain that includes state 1 508, the authentication server in such an embodiment may estimate the current location of the authorized subscriber at state 2 510 based on the earlier recorded state measurement of state 1 508, and transmit the decrypted block chain for that authorized subscriber to the gateway servicing area 504. In such an embodiment, the gateway node servicing area 504 may then transmit a request to the mobile information handling system requesting access to provide a current measurement of its location, and may receive and store measurement location of the mobile information handling system requesting access at state 3 512.

As another example, in the second scenario described with reference to FIG. 5 above, if the gateway node servicing area 506 receives a request from a mobile information handling system located at state 4 514 to access the nomadic computing services of the authorized user associated with the block chain that includes state 1 508 and state 2 510, the authentication server in such an embodiment may estimate the current location of the authorized subscriber at state 3 512 based on the earlier recorded state measurements of state 1 508 and state 2 510, and transmit the decrypted block chain for that authorized subscriber to the gateway servicing area 504. In such an embodiment, if the user can correctly provide a second user credential, the gateway servicing area 506 may request a current location measurement for the mobile information handling system requesting access to the authorized subscriber's nomadic computing resources, and may receive and store measurement location of the mobile information handling system requesting access at state 4 514.

As another example, in the embodiment described with reference to FIG. 4, and as described above, the location fingerprint security system may receive from an information handling system requesting access a measurement of its location in Hyderabad, India at 07:48:16 on Jun. 2, 2017. The location of the information handling system requesting access may be measured via a GPS logic circuit within the information handling system, or by mapping the IP address of the requesting information handling system, for example. As another example, in the embodiment described above with reference to FIG. 6, the location fingerprint security system may receive a request for access from an information handling system at GPS coordinates 41.237 and −73.2 degrees at 16:40:22 on Jun. 1, 2017.

As shown in FIG. 8, at block 904, in an embodiment, the location fingerprint security system may determine whether the measured location of the requesting information handling system falls within a radius surrounding the estimated location of the subscriber, where the radius has a length equal to or lesser than the confidence interval value. For example, in the first scenario described above with reference to FIG. 5, in an embodiment, the location fingerprint security system operating at the gateway node servicing the area 504 may determine the measured location at state 3 512 of the requesting information handling system falls within a radius surrounding the estimated location of the subscriber at state 2 510, where the radius has a length equal to or lesser than the confidence interval value. As another example, in the second scenario described above with reference to FIG. 5, in an embodiment, the location fingerprint security system operating at the gateway node servicing the area 506 may determine the measured location at state 4 514 of the requesting information handling system does not fall within a radius surrounding the estimated location of the subscriber at state 3 512, where the radius has a length equal to or lesser than the confidence interval value. In other words, in such a scenario, the measured location at state 4 514 may fall outside the area in which the authentication server has estimated the subscriber is currently located, even considering error tolerances associated with that estimation.

As another example, the location fingerprint security system in an embodiment described with respect to FIG. 4 may determine the measured location of Hyderabad, India of the requesting information handling system does not fall within a radius of 1 meters from the estimated location of the subscriber within London, UK. As another example, the location fingerprint security system in the embodiment described with respect to FIG. 6 may determine the measured location of GPS coordinates 41.237 and −73.2 degrees of the requesting information handling system does not fall within the 1 meter radius of the estimated GPS coordinates 40.7354, and −73.97 degrees of the subscriber.

As shown in FIG. 9, if the measured location of the requesting information handling system is determined to fall within a radius equivalent to or lesser than the confidence interval value around the estimated location of the subscriber in an embodiment, the method may proceed to block 910. If the measured location of the requesting information handling system is determined to fall outside a radius equivalent to or lesser than the confidence interval value around the estimated location of the subscriber system in an embodiment, the method may proceed to block 906.

At block 906, the location fingerprint security system in an embodiment may transmit a request for and receive a second user credential. The location fingerprint security system in an embodiment, after determining the requesting information handling system does not fall within the estimated location of the subscriber, may request further information from the requesting information handling system identifying the user of the requesting information handling system as the subscriber. For example, a challenge to the user may be sent for a login password for a required authentication code. The authentication code, for example, may be sent to a known e-mail or text address in an embodiment. A login may be established previously, however, in some embodiments. Other security challenges known in the art may be used according to various embodiments.

At block 908, the location fingerprint security system in an embodiment may determine whether the user requesting access correctly provided a second user credential. A second user credential could include any form of user identification not already used as the first user credential in block 802 of FIG. 8, as described above. The second user credential could include, but not be limited to a password, a username, an IP address, a fingerprint, a retinal scan, a facial recognition ID, a voice recognition ID, or any other type of user identification known in the art, as well as the correct answer to a preset verification question. If the location fingerprint security system determines the user has correctly provided a second user credential identifying the user as an authorized subscriber, the method may proceed to block 910. If the location fingerprint security system determines the user has not correctly provided a second user credential identifying the user as an authorized subscriber, the method may proceed to block 914.

At block 910, in an embodiment, the location fingerprint security system operating at the authentication server may add the estimated subscriber location fingerprint to the block chain of subscriber location fingerprints. As described above, if the information handling system requesting access can establish it is co-located with the estimated position of the subscriber, as determined above at block 904, the location fingerprint security system may assume the requesting information handling system is being operated by the authorized subscriber. Similarly, if the user of the requesting information handling system can verify it is an authorized subscriber by supplying a correct second user credential, as determined above at block 908, the location fingerprint security system may also assume the requesting information handling system is being operated by the authorized subscriber. In both of these scenarios, the location fingerprint security system may also assume the received measured location for the requesting information handling system was correct, and may store that measured state variable as a subscriber location fingerprint within that subscriber's block chain of subscriber location fingerprints.

At block 912, in an embodiment, the location fingerprint security system may grant the requesting information handling system access to the subscriber's nomadic computing services. As described above, if the information handling system requesting access can establish it is co-located with the estimated position of the subscriber, as determined above at block 904, or if the user of the information handling system requesting access can establish it is the authorized subscriber by supplying a correct second user credential, as determined above at block 908, the location fingerprint security system may also assume the requesting information handling system is being operated by the authorized subscriber. Consequently, if either of these scenarios occur, the location fingerprint security system may grant access to the requesting information handling system being operated by the verified subscriber.

At block 914, in an embodiment, the location fingerprint security system may lock the user account, denying access to the subscriber's nomadic computing services from any requesting mobile information handling system, and disregard the measured location of the requesting information handling system in future estimations of the subscriber's location. If the user of the information handling system requesting access cannot establish it is co-located with the estimated position of the subscriber, as determined above at block 904, or if the user of the information handling system requesting access cannot establish it is the authorized subscriber by supplying a correct second user credential, as determined above at block 908, the location fingerprint security system may also assume the requesting information handling system is not being operated by the authorized subscriber, and that the subscriber's nomadic computing services are currently under attack from a malicious remote hack. In such a scenario, the location fingerprint security system in an embodiment may lock the user account by transmitting a message to the remote server that initiated the security measures of the location fingerprint security system, as described above, to deny access to the subscriber's nomadic computing services to any information handling system requesting access.

As described above, in a scenario in which the location fingerprint security system has granted access to an information handling system determined to be operated by an authorized subscriber, the location fingerprint security system in an embodiment may add the measured location of the requesting user to that subscriber's block chain of subscriber location fingerprints. In contrast, in block 914, in a scenario where the location fingerprint security system denies access to the requesting information handling system, it has done so because it cannot be determined that the measured location of the requesting information handling system is the same as the estimated location of the subscriber. As a consequence, in such a scenario, the location fingerprint security system in an embodiment may not store the measured location of the requesting information handling system within that subscriber's block chain of subscriber location fingerprints, and may disregard that measured location of the requesting information handling system when performing future estimations of the subscriber's location.

The blocks of the flow diagrams of FIGS. 7-9 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system of a mobile edge computing gateway operating a location fingerprint security system comprising:
    a memory for storing a plurality of blocks within a block chain of a location fingerprint for a subscribing user, each block including a time-stamped record of a plurality of estimated or measured location state variables of the subscribing user and an associated confidence interval representing an accuracy of the estimated or measured location state variables; and
    a processor executing machine readable executable code instructions of the location fingerprint security system to:
        receive a request to access the mobile edge computing gateway, a first user credential, and an encrypted token from a requesting user;
        associate the first user credential with a block chain location fingerprint for the subscribing user, and decrypt the location fingerprint;
        receive a requesting user location measurement;
        predict a current location for the subscribing user and an associated current confidence interval based on the estimated or measured location state variables in the location fingerprint associated with the most recent time stamp; and
        allow the requesting user access to the mobile edge computing gateway when the received requesting user location measurement falls within the value of the current confidence interval.

2. The information handling system operating a location fingerprint security system of claim 1 further comprising:
    the processor executing machine readable executable code instructions of the location fingerprint security system to:
        transmit a challenge request to the requesting user for a second user credential if the received requesting user location measurement falls outside the value of the current confidence interval; and
        allow access to the mobile edge computing gateway upon receipt of the second user credential affirmatively identifying the requesting user as the subscribing user.

3. The information handling system operating the location fingerprint security system of claim 2 further comprising:
    the processor executing machine readable executable code instructions of the location fingerprint security system to disallow access by the requesting user and future requesting users upon receipt of a second user credential failing to identify the requesting user as the subscribing user.

4. The information handling system operating the location fingerprint security system of claim 2 further comprising:
    the processor executing code instructions to:
        receive a second user credential affirmatively identifying the requesting user as the subscribing user; and
        generate an updated block, stamped with the time of receipt of the request to access the mobile edge computing gateway, including the current estimated subscribing user location and current confidence interval, and adding the updated block to the subscribing user's block chain.

5. The information handling system operating the location fingerprint security system of claim 1, wherein the requesting user location measurement is determined via a global positioning satellite location circuit within a mobile user information handling system in use by the requesting user.

6. The information handling system operating the location fingerprint security system of claim 1 further comprising:
    the location fingerprint security system predicting the current location of the subscribing user by applying a Kalman filter to at least one recently time-stamped location fingerprint in the subscribing user's block chain having a confidence interval above a threshold level.

7. The information handling system operating the location fingerprint security system of claim 1, wherein each block chain location fingerprint data is made available via an encryption key and a secure address location separately provided.

8. A method of securing access to a mobile edge computing gateway based on a location fingerprint comprising:
  receiving a request to access the mobile edge computing gateway, a first user credential, and an encrypted token from a requesting user;
  associating the first user credential with a block chain location fingerprint for a subscribing user, the block chain including a plurality of blocks, each block including a time-stamped record of a plurality of estimated or measured location state variables of the subscribing user and an associated confidence interval representing an accuracy of the estimated or measured location state variables, and decrypt the location fingerprint;
  receiving a requesting user location measurement;
  predicting a current location for the subscribing user and an associated current confidence interval based on the estimated or measured location state variables in the location fingerprint associated with the most recent time stamp; and
  allowing the requesting user access to the mobile edge computing gateway when the received requesting user location measurement falls within the value of the current confidence interval.

9. The method of securing access to a mobile edge computing gateway based on a location fingerprint of claim 8, further comprising:
  transmitting a challenge request to the requesting user for a second user credential if the received requesting user location measurement falls outside the value of the current confidence interval; and
  allowing access to the mobile edge computing gateway upon receipt of the second user credential affirmatively identifying the requesting user as the subscribing user.

10. The method of securing access to a mobile edge computing gateway based on a location fingerprint of claim 9, further comprising:
  disallowing access by the requesting user and future requesting users upon receipt of a second user credential failing to identify the requesting user as the subscribing user.

11. The method of securing access to a mobile edge computing gateway based on a location fingerprint of claim 9, further comprising:
  receiving a second user credential affirmatively identifying the requesting user as the subscribing user; and
  generating an updated block, stamped with the time of receipt of the request to access the mobile edge computing gateway, including the current estimated subscribing user location and current confidence interval, and adding the updated block to the subscribing user's block chain.

12. The method of securing access to a mobile edge computing gateway based on a location fingerprint of claim 8, wherein the requesting user location measurement is determined via a global positioning satellite location circuit within a mobile user information handling system in use by the requesting user.

13. The method of securing access to a mobile edge computing gateway based on a location fingerprint of claim 8 further comprising:
  predicting the current location of the subscribing user by applying a Kalman filter to at least one recently time-stamped location fingerprint in the subscribing user's block chain having a confidence interval above a threshold level.

14. The method of securing access to a mobile edge computing gateway based on a location fingerprint of claim 8 wherein each block chain location fingerprint data is made available via an encryption key and a secure address location separately provided.

15. An information handling system of a mobile edge computing gateway and an authentication server operating a location fingerprint security system comprising:
  a memory of the authentication server for storing a plurality of blocks within a block chain of a location fingerprint for a subscribing user, each block including a time-stamped record of a plurality of estimated or measured location state variables of the subscribing user and an associated confidence interval representing an accuracy of the estimated or measured location state variables; and
  a processor of the authentication server executing machine readable executable code instructions of the location fingerprint security system to:
    receive a request to access the mobile edge computing gateway, a first user credential, and an encrypted token from a requesting user via the mobile edge computing gateway;
    associate the first user credential with a block chain location fingerprint for the subscribing user, and decrypt the location fingerprint;
    predict a current location for the subscribing user and an associated current confidence interval;
    determine whether the mobile edge computing gateway services a geographic area including the predicted current location; and
  a processor of the mobile edge computing gateway executing code instructions if the authentication server determines the mobile edge computing gateway services the geographic area including the predicted current location to:
    receive a requesting user location measurement; and
    allow the requesting user access to the mobile edge computing gateway when the received requesting user location measurement falls within the value of the current confidence interval.

16. The information handling system operating a location fingerprint security system of claim 15 further comprising:
  the processor of the authentication server executing machine readable executable code instructions of the location fingerprint security system to:
    transmit a challenge request to the requesting user for a second user credential if the authentication server determines the mobile edge computing gateway does not service the geographic area including the predicted current location; and
  the processor of the mobile edge computing gateway executing code instructions to:
    upon receipt of the second user credential affirmatively identifying the requesting user as the subscribing user, request and receive a requesting user location measurement; and
    allow access to a second mobile edge computing gateway servicing the area including the predicted current location when the received requesting user location measurement falls within the value of the current confidence interval.

17. The information handling system operating the location fingerprint security system of claim 16 further comprising:
  the processor of the authentication server executing machine readable executable code instructions of the location fingerprint security system to disallow access by the requesting user and future requesting users upon receipt of a second user credential failing to identify the requesting user as the subscribing user.

18. The information handling system operating the location fingerprint security system of claim 15 further comprising:

the processor of the mobile edge computing gateway to transmit the received requesting user location measurement to the authentication server; and the processor of the authentication server executing code instructions to:

determine the received requesting user location measurement falls within the value of the current confidence interval; and generate an updated block, stamped with the time of receipt of the request to access the mobile edge computing gateway, including the current estimated subscribing user location and current confidence interval, and adding the updated block to the subscribing user's block chain.

19. The information handling system operating a location fingerprint security system of claim 16 further comprising:

the processor of the authentication server executing machine readable executable code instructions of the location fingerprint security system to:

transmit a challenge request to the requesting user via the mobile edge computing gateway for a third user credential if the received requesting user location measurement falls outside the value of the current confidence interval; and allow access to the mobile edge computing gateway upon receipt of the third user credential affirmatively identifying the requesting user as the subscribing user.

20. The information handling system operating the location fingerprint security system of claim 19 further comprising:

the processor executing machine readable executable code instructions of the location fingerprint security system to disallow access by the requesting user and future requesting users upon receipt of a third user credential failing to identify the requesting user as the subscribing user.

\* \* \* \* \*